United States Patent [19]

Tsuchiyama

[11] Patent Number: 5,847,657
[45] Date of Patent: Dec. 8, 1998

[54] RADIO SELECTIVE CALLING RECEIVER CAPABLE OF CHECKING TIME PERIOD OF STAY OUTSIDE COVERAGE ZONE

[75] Inventor: Kinya Tsuchiyama, Shizuoka, Japan

[73] Assignee: NEC Corporation, Tokyo, Japan

[21] Appl. No.: 718,843

[22] Filed: Sep. 24, 1996

[30] Foreign Application Priority Data

Sep. 26, 1995 [JP] Japan .................................. 7-247706

[51] Int. Cl.$^6$ .............................. H04B 7/00; H04B 1/00; H04Q 7/00
[52] U.S. Cl. ...................... 340/825.44; 455/421
[58] Field of Search .................... 340/825.44, 825.2; 370/350, 337; 455/38.3, 38.2, 502, 343, 38.1, 566, 421, 422; 375/356

[56] References Cited

U.S. PATENT DOCUMENTS

| | | | |
|---|---|---|---|
| 5,148,160 | 9/1992 | Kudoh | 340/825.44 |
| 5,182,553 | 1/1993 | Kung | 340/825.44 |
| 5,511,231 | 4/1996 | Ono | 340/825.44 |

FOREIGN PATENT DOCUMENTS

| | | |
|---|---|---|
| 2-94826 | 4/1990 | Japan . |
| 4-306926 | 10/1992 | Japan . |

*Primary Examiner*—Michael Horabik
*Assistant Examiner*—Jean B. Jeanglaude
*Attorney, Agent, or Firm*—Sughrue, Mion, Zinn, Macpeak & Seas, PLLC

[57] ABSTRACT

A radio selective calling receiver has a function of determining, when synchronization is established by a frame synchronization signal received from a radio base station, that the radio selective calling receiver is within a coverage zone of the radio base station, and determining, when the frame synchronization signal is not received within a predetermined time period after a step-out state is set, that the radio selective calling receiver is outside the coverage zone of the radio base station. The receiver includes a timer and a notification device. The timer starts to count when the step-out state is set and counts a time until the frame synchronization signal is received. The notification device notifies a count value when the frame synchronization signal is received after the lapse of the predetermined time period set in the timer.

4 Claims, 9 Drawing Sheets

FIG. IA
PRIOR ART

```
2 JAN 1994 (SUN)

```
2 JAN 1994 (SUN)

NON-COVERAGE-ZONE SETTING MENU

1: NOTIFICATION SETTING
2: DISPLAY SETTING

FIG. 7B

NOTIFICATION SETTING SELECTION WINDOW

On    Off

FIG. 7C

NOTIFICATION METHOD SELECTION WINDOW

SP    VIB

FIG. 7D

DISPLAY SETTING SELECTION WINDOW

MODE 1
MODE 2
Off

```
NON-COVERAGE-ZONE STAY TIME

1. TIME FROM COVERAGE-ZONE
   TO NON-COVERAGE-ZONE
        PM 02:15

2. NON-COVERAGE-ZONE STAY
   TIME
        01 : 45
```

FIG. 9B

```
        MESSAGE

1. YOKOHAMA STATION AT 10:00
        AM 09:30

NON-COVERAGE-ZONE
   STAY TIME
   PM 02:15 ~ 01:45
```

RADIO SELECTIVE CALLING RECEIVER CAPABLE OF CHECKING TIME PERIOD OF STAY OUTSIDE COVERAGE ZONE

BACKGROUND OF THE INVENTION

1. Field of the Invention

The present invention relates to a radio selective calling receiver and, more particularly, to a radio selective calling receiver having a function of determining whether the receiver is within or outside the coverage zone of a radio base station and a function of notifying the holder of the receiver (to be referred to as the user hereinafter) of the time period of a stay outside the coverage zone.

2. Description of the Prior Art

In general, for a radio selective calling receiver, there are a range in which calling can be performed (within the coverage zone) and a range in which no reception can be performed (outside the coverage zone) depending on the distance from a radio base station or the presence/absence of a radio wave propagation path. The radio base station cannot properly call the radio selective calling receiver outside the coverage zone.

For this reason, the user must check whether his/her current position is within or outside the coverage zone once in a while.

As the first and second examples of conventional techniques of checking a current position, a "selective calling receiver" disclosed in Japanese Unexamined Patent Publication No. 4-306926 and a "scheme of notifying that mobile radio unit is outside coverage zone" disclosed in Japanese Unexamined Patent Publication No. 2-94826 are available.

In the first example, a reception determination circuit is used to check whether reception can be performed in a current state, and the time period during which reception could not be performed is detected on the basis of an output from a time counting circuit to be stored in a RAM. Subsequently, the stored contents are displayed on an LCD by operating a switch. That is, the time when the radio selective calling receiver has moved outside the coverage zone and the time when the radio selective calling receiver has moved into the coverage zone are stored, and the time period during which the radio selective calling receiver has stayed outside the coverage zone after the receiver moved outside the coverage zone is displayed.

In the second example, a radio selective calling receiver monitors the arrival of a position notification signal from each stationary radio unit. If no position notification signal having a predetermined level or higher can be detected from any stationary radio unit within a predetermined time period, the radio selective calling receiver generates a predetermined warning sound or performs a predetermined display operation to notify the user that the receiver is outside the coverage zone of any stationary ratio unit.

Figure 1A:
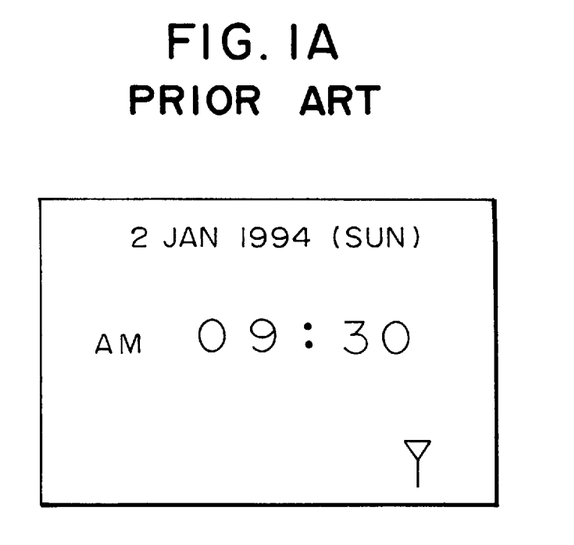
FIGS. 1A and 1B are views showing examples of the display windows of an LCD when a conventional radio selective calling receiver is located within and outside the coverage zone.
Figure 1B:
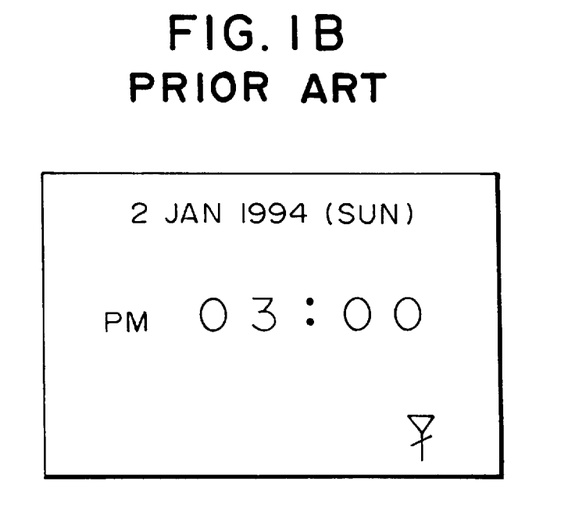

FIGS. 1A and 1B show examples of the display windows of an LCD in a conventional apparatus or scheme and, more specifically, a window displayed while the radio selective calling receiver is within the coverage zone, and a window displayed while the radio selective calling receiver is outside the coverage zone.

In the window shown in FIG. 1A, a coverage-zone mark is turned on or flickered, and data indicating that the radio selective calling receiver is within the coverage zone on Jan. 2, 1994 (Monday) at 9:30 am is displayed.

In the window shown in FIG. 1B, a non-coverage-zone mark is turned on or flickered, and data indicating that the radio selective calling receiver is outside the coverage zone on Jan. 2, 1994 (Monday) at 3:00 pm is displayed.

As is apparent, when the radio selective calling receiver is outside the coverage zone, an incoming call cannot be received, and hence the radio selective calling receiver cannot perform its original function. It is therefore important to check whether the radio selective calling receiver has been outside the coverage zone, i.e., the time period during which reception could not be performed.

In the second example, in order to check whether the user is within or outside the coverage zone, the user needs to operate the switch to check whether the coverage-zone or non-coverage-zone mark is turned or flickered on the LCD. With this operation, the user can check whether he/she is within or outside the coverage zone. However, the user cannot check the time period during which he/she has been outside the coverage zone.

Furthermore, in the second example, the radio selective calling receiver generates a predetermined warning sound or performs a predetermined display operation to notify the user that he/she has moved outside the coverage zone. If, however, the user fails to notice this notification, he/she cannot know the time when he/she has moved outside the coverage zone.

SUMMARY OF THE INVENTION

It is an object of the present invention to provide a radio selective calling receiver which allows a user to check a time period during which the radio selective calling receiver stayed outside a coverage zone (non-coverage-zone stay time) upon switching operation performed by the user when the radio selective calling receiver has moved outside the coverage zone, automatically notifies the user of movement of the radio selective calling receiver upon movement of the receiver into the coverage zone, and can display a non-coverage-zone stay time to allow the user to easily check the non-coverage-zone stay time.

In order to achieve the above object, according to a basic aspect of the present invention, there is provided a radio selective calling receiver having a function of determining, when synchronization is established by a frame synchronization signal received from a radio base station, that the radio selective calling receiver is within a coverage zone of the radio base station, and determining, when the frame synchronization signal is not received within a predetermined time period after a step-out state is set, that the radio selective calling receiver is outside the coverage zone of the radio base station, comprising a timer for starting to count when the step-out state is set and counting a time until the frame synchronization signal is received, and notification means for notifying a count value when the frame synchronization signal is received after the lapse of the predetermined time period set in the timer.

According to the basic aspect, the receiver further comprises display means for displaying the count value when the frame synchronization signal is received after the lapse of the predetermined time period set in the timer, and display selection operation means for allowing a user to select whether to perform a display operation, or a display method if execution of a display operation is selected, the display means performing a display operation by a display method selected by the user.

In addition, according to the basic aspect, the notification means comprises a plurality of notification devices including a speaker and a vibration motor, and notification selection operation means for allowing a user to select at least one of the notification devices.

According to another aspect of the present invention, there is provided a radio selective calling receiver comprising a radio section for receiving and demodulating an individual call signal from the radio base station, an EEPROM in which a self-call signal and system information unique to the self-radio selective calling receiver are stored in advance, a switch circuit for outputting a designation signal for selecting a display method upon switching operation, a decoder for decoding a signal demodulated by the radio section, comparing the decoded signal with the self-call signal stored in the EEPROM, and outputting received data when the decoded signal coincides with the self-call signal, a ROM in which a program for controlling the self-radio selective calling receiver is stored in advance, a CPU for executing the control program, a RAM for storing or outputting received data under the control of the CPU, an LCD for displaying data, and a speaker and a vibration motor for, when reception is performed, notifying a user of corresponding information.

According to the present invention with the above aspects: [1] there is provided a radio selective calling receiver having a function of determining, when synchronization is established by a frame synchronization signal received from a radio base station, that the radio selective calling receiver is within a coverage zone of the radio base station, and determining, when the frame synchronization signal is not received within a predetermined time period after a step-out state is set, that the radio selective calling receiver is outside the coverage zone of the radio base station, comprising a timer for starting to count when a step-out state is set and counting a time until the frame synchronization signal is received, and notification means for notifying a count value when the frame synchronization signal is received after the lapse of the predetermined time period set in the timer; [2] the receiver further comprises display means for displaying the count value when the frame synchronization signal is received after the lapse of the predetermined time period set in the timer, and display selection operation means for allowing a user to select whether to perform a display operation, or a display method if execution of a display operation is selected, the display means performing a display operation by a display method selected by the user; [3] the notification means comprises a plurality of notification devices including a speaker and a vibration motor, and notification selection operation means for allowing a user to select at least one of the notification devices; and, [4] according to another aspect, the receiver further comprises a radio section for receiving and demodulating an individual call signal from the radio base station, an EEPROM in which a self-call signal and system information unique to the self-radio selective calling receiver are stored in advance, a switch circuit for outputting a designation signal for selecting a display method upon switching operation, a decoder for decoding a signal demodulated by the radio section, comparing the decoded signal with the self-call signal stored in the EEPROM, and outputting received data when the decoded signal coincides with the self-call signal, a ROM in which a program for controlling the self-radio selective calling receiver is stored in advance, a CPU for executing the control program, a RAM for storing or outputting received data under the control of the CPU, an LCD for displaying data, and a speaker and a vibration motor for, when reception is performed, notifying a user of corresponding information. With these arrangements, when the radio selective calling receiver has moved outside the coverage zone, the user can check the non-coverage-zone stay time upon switching operation. Therefore, the user can easily check the non-coverage-zone stay time, which cannot be checked according to a conventional technique, to eliminate the distrustful feeling that he/she would receive no response to a call because the radio selective calling receiver is outside the coverage zone. This greatly improves services for the user.

The above and many other advantages, features and additional objects of the present invention will become manifest to those versed in the art upon making reference to the following detailed description and accompanying drawings in which preferred embodiments incorporating the principles of the present invention are shown by way of illustrative example.

BRIEF DESCRIPTION OF THE DRAWINGS

FIG. 4 is a flow chart showing an operation to be performed in the embodiment in FIG. 2 when the power supply is turned on;

FIGS. 7A to 7D are views respectively showing examples of the display windows of an LCD in the embodiment in FIG. 2, in which

DETAILED DESCRIPTION OF THE PREFERRED EMBODIMENT

A preferred embodiment of the present invention will be described below with reference to the accompanying drawings.

Figure 2:
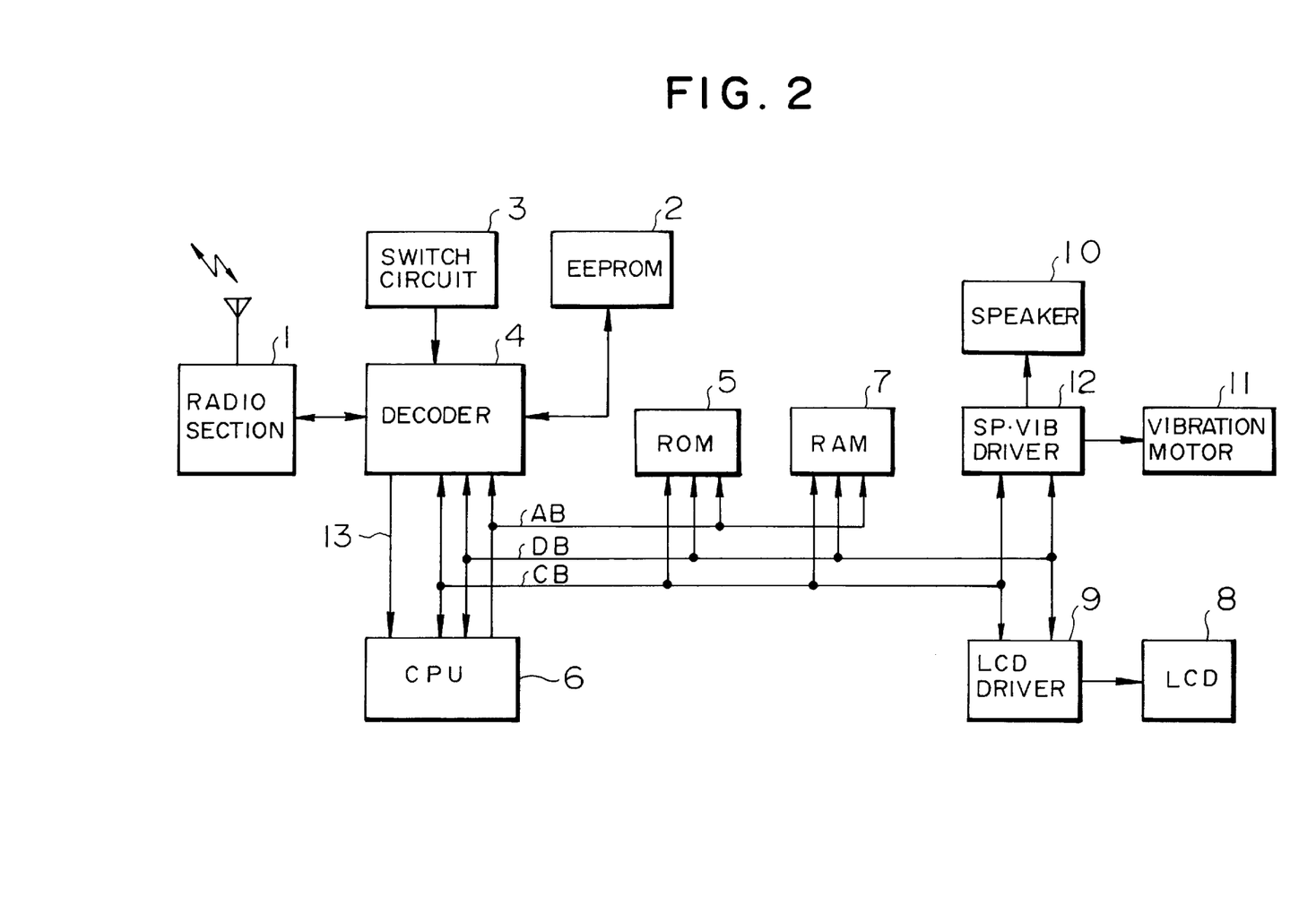
FIG. 2 is a block diagram showing the arrangement of a radio selective calling receiver according to an embodiment of the present invention.

FIG. 2 is a block diagram showing the arrangement of a radio selective calling receiver according to an embodiment of the present invention. As shown in FIG. 2, the radio selective calling receiver of the present invention includes a radio section 1 for receiving an individual call signal from a radio base station through an antenna and demodulating it, an EEPROM (Electrically Erasable Programmable Read-Only Memory) 2 in which a self-call signal and system information unique to the self-radio selective calling receiver are stored in advance, a switch circuit 3 for outputting a designation signal for selecting a display method upon a switch operation, a decoder 4 for decoding a signal demodulated by the radio section 1, comparing the decoded signal with the self-call signal stored in the EEPROM 2, and outputting received data when the decoded signal coincides with the self-call signal, a ROM 5 in which a program for controlling the self-radio selective calling receiver is stored in advance, a CPU 6 for executing this control program, a RAM 7 for receiving or outputting received data under the control of the CPU 6, an LCD (Liquid Crystal Display element) 8, an LCD driver 9 for driving the LCD 8 under the control of the CPU 6, a speaker 10 and a vibration motor 11 for notifying a user of the execution of reception, and a SP·VIB driver 12 for driving the speaker 10 and the vibration motor 11 under the control of the CPU 6.

The decoder 4, the ROM 5, the CPU 6, and the RAM 7 are connected to each other through an address bus AB, a data bus DB, and a control bus CB. The LCD driver 9 and the SP·VIB driver 12 are connected to the address bus AB and the control bus CB.

Figure 3:
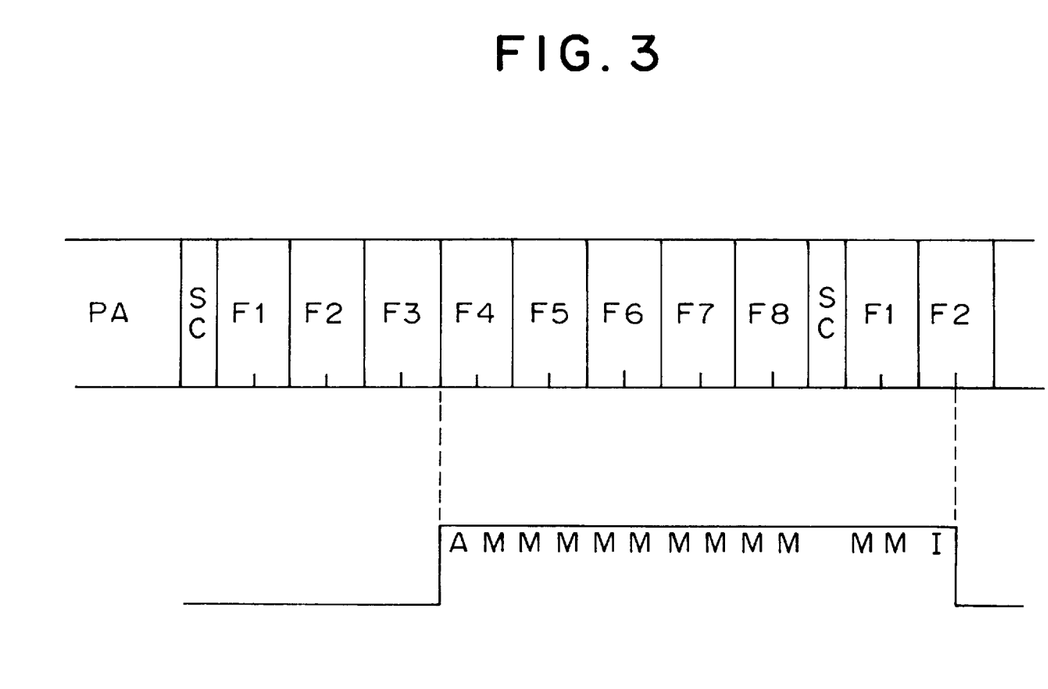
FIG. 3 is a view showing the format of a signal transmitted from a radio base station and used in the present invention.

FIG. 3 shows the format of a signal transmitted from a radio base station and used in this embodiment.

Referring to FIG. 3, a transmission signal from the radio base station is constituted by a preamble signal PA, a frame synchronization signal SC, and frame numbers F1, . . . , F8.

After synchronization is established with the frame synchronization signal SC, for example, coincidence between the first code word (call number code word A) of the fourth frame F4 and the call number code (address code) of the self-radio selective calling receiver is detected. Subsequent message code words M have been received up to the next frame F2 corresponding to an empty state or a call number I of another radio selective calling receiver.

The operation of the radio selective calling receiver of this embodiment will be described with reference to FIGS. 2, 4, 5, 6, and 7A to 7D.

Figure 4:
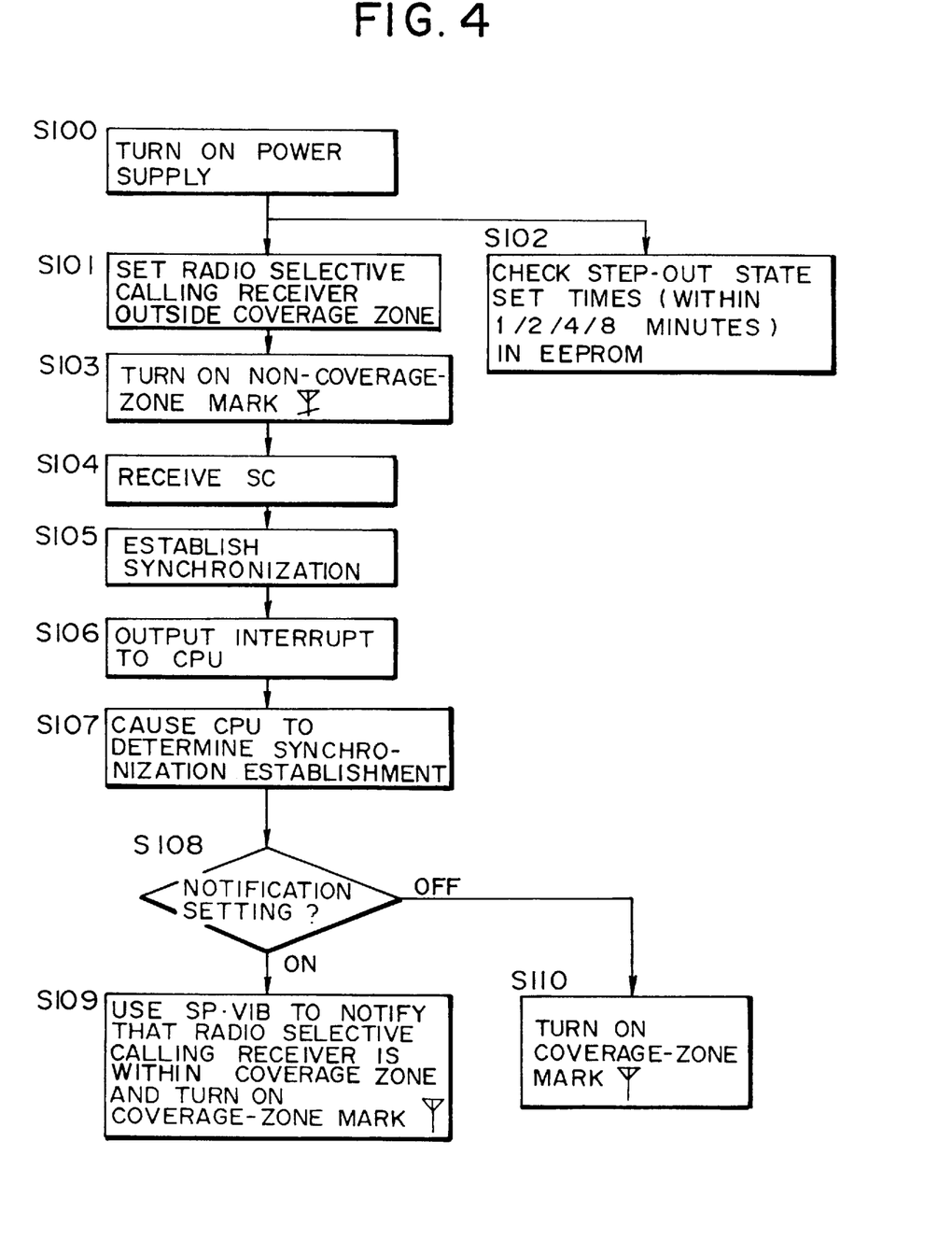
Figure 5:
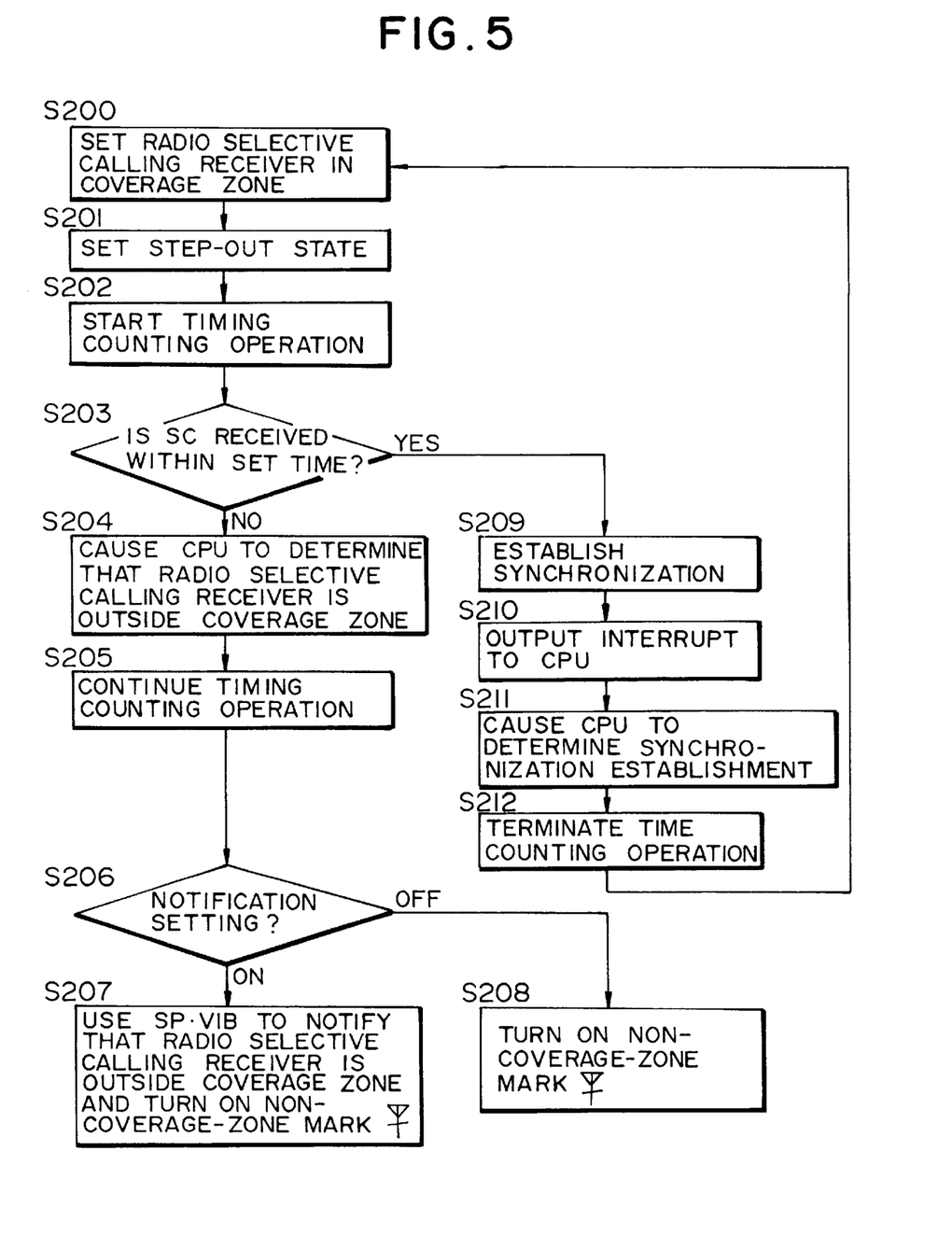
FIG. 5 is a flow chart showing an operation to be performed when the embodiment in FIG. 2 is moved outside the coverage zone.
Figure 6:
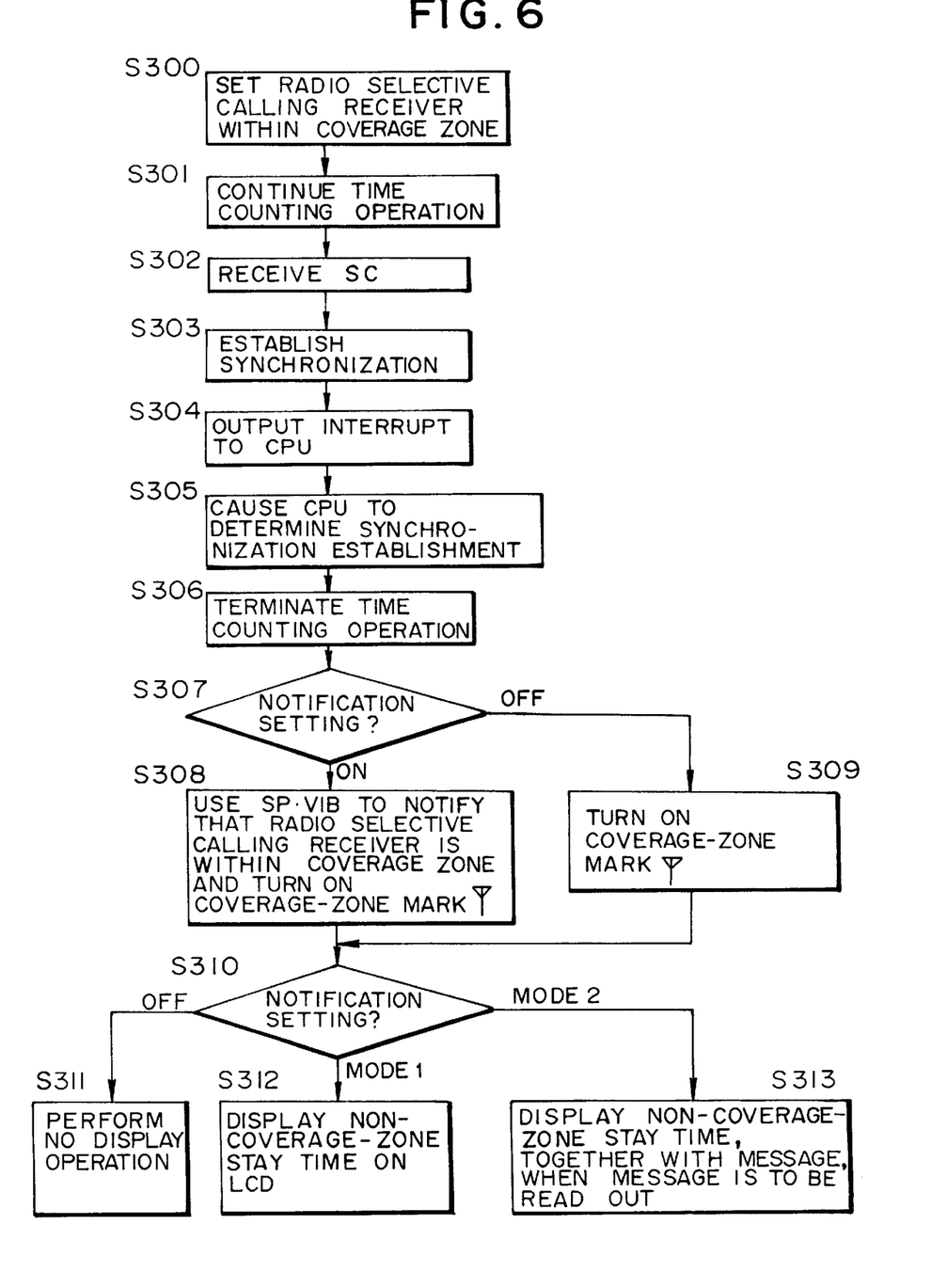
FIG. 6 is a flow chart showing an operation to be performed when the embodiment in FIG. 2 is moved into the coverage zone.
Figure 7A:
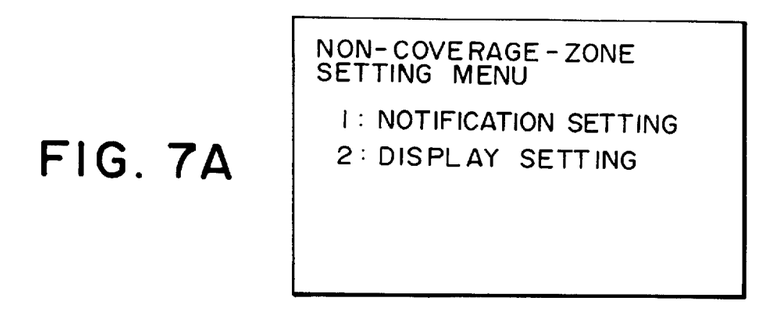
FIG. 7A shows a non-coverage-zone setting menu window.
Figure 7B:
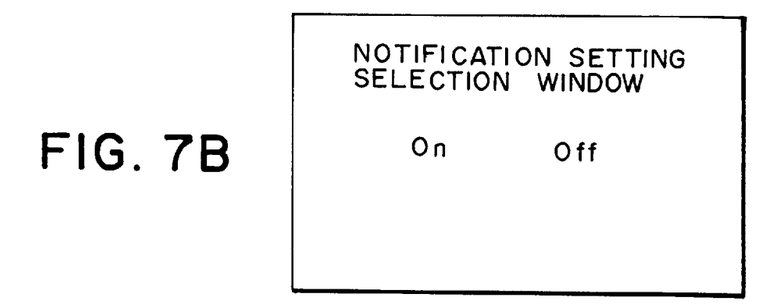
FIG. 7B shows a notification setting selection window.
Figure 7C:
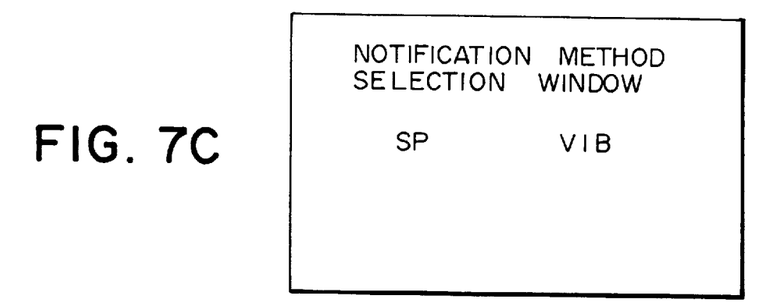
FIG. 7C shows a notification method selection window.
Figure 7D:
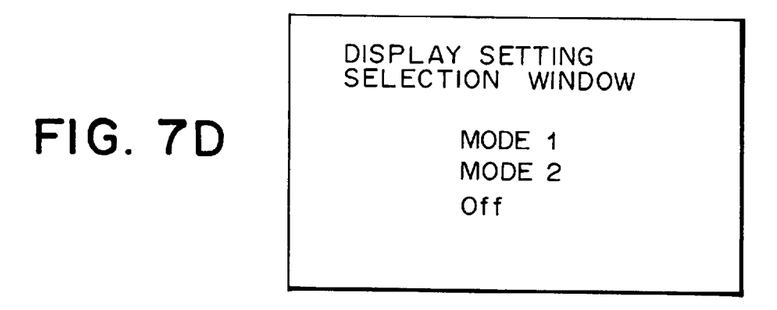
FIG. 7D shows a display setting selection window.

FIG. 4 is a flow chart showing an operation to be performed when the power supply of the radio selective calling receiver in FIG. 2 is turned on. FIG. 5 is a flow chart showing an operation to be performed when the radio selective calling receiver has moved outside the coverage zone. FIG. 6 is a flow chart showing an operation to be performed when the radio selective calling receiver has moved into the coverage zone. FIGS. 7A to 7D show examples of the message display windows of the radio selective calling receiver in FIG. 2. FIG. 7A shows a non-coverage-zone setting menu window. FIG. 7B shows a notification setting selection window. FIG. 7C shows a notification method selection window. FIG. 7D shows a display setting selection window.

When the power supply of the radio selective calling receiver is turned on (step S100), the radio selective calling receiver is set in non-coverage-zone setting (step S101). At the same time, the decoder 4 checks step-out state set times (e.g., within 1/2/4/8 minutes) in the EEPROM 2 (step S102).

Since non-coverage-zone setting is set in step S101, the CPU 6 turns on the non-coverage-zone mark on the LCD 8 through the LCD driver 9 (step S103).

When the radio section 1 receives the frame synchronization signal SC (step S104), the decoder 4 establishes synchronization (step S105), and the decoder 4 outputs an interrupt to the CPU 6 (step S106).

Upon reception of this interrupt, the CPU 6 checks the decoder 4 through the control bus CB to check the type of interrupt, and determines synchronization establishment (step S107).

When synchronization establishment is determined, the CPU 6 checks the contents of notification setting (step S108). If "On" is set on the notification setting selection window in FIG. 7B, "SP" (notification by means of the speaker) or "VIB" (notification by means of the vibration motor) is selected on the notification method selection window in FIG. 7C to instruct the SP·VIB driver 12 to notify, with the speaker 10 or the vibration motor 11, that the radio selective calling receiver is within the coverage zone. At the same time, the CPU 6 instructs the LCD driver 9 to turn on the coverage-zone mark on the LCD 8 (step S109).

If "Off" is set on the notification setting selection window in step S108, the coverage-zone mark is only turned on (step S110).

When the radio selective calling receiver moves outside the coverage zone (step S200), a step-out state is set (step S201). At the same time, a time counting operation is started (step S202).

The CPU 6 checks whether the frame synchronization signal SC is received within a set time (step S203). If it is determined that the frame synchronization signal SC is not received within the set time (NO in step S203), the CPU 6 determines that the radio selective calling receiver is outside the coverage zone (step S204), and continues the time counting operation (step S205).

The CPU 6 checks the contents displayed on the notification setting selection window (step S206). If "On" is set, the CPU 6 instructs the SP·VIB driver 12 to cause the speaker 10 or the vibration motor 11 to notify that the radio selective calling receiver is outside the coverage zone. In addition, the CPU 6 instructs the LCD driver 9 to turn on the non-coverage-zone mark on the LCD 8 (step S207).

If "Off" is set on the notification setting selection window in step S206, the non-coverage-zone mark is only turned on (step S208).

If it is determined in step S203 that the frame synchronization signal SC is received within the set time, the decoder 4 establishes synchronization (step S209), and the decoder 4 outputs an interrupt to the CPU 6 (step S210).

Upon reception of this interrupt, the CPU 6 checks the decoder 4 to check the type of interruption. If the CPU 6 determines synchronization establishment (step S211), the CPU 6 terminates the time counting operation of the timer (step S212). The flow then returns to the step of setting the radio selective calling receiver in coverage-zone setting (step S200).

Upon movement of the radio selective calling receiver into the coverage zone (step S300), when the frame synchronization signal SC is received (step S302) while the time counting operation of the timer continues (step S301), the decoder 4 then establishes synchronization (step S303). The decoder 4 outputs an interrupt to the CPU 6 (step S304).

Upon reception of this interrupt, the CPU 6 checks the decoder 4 to check the type of interrupt. When the CPU 6 determines synchronization establishment (step S305), the CPU 6 terminates the time counting operation of the timer (step S306).

Upon determination of synchronization establishment, the CPU 6 checks the contents displayed on the notification setting selection window (step S307). If "On" is set, the CPU 6 instructs the SP-VIB driver 12 to cause the speaker 10 or the vibration motor 11 to notify that the radio selective calling receiver is within the coverage zone, and also instructs the LCD driver 9 to turn on the coverage-zone mark on the LCD 8 (step S308).

If it is determined in step S307 that "Off" is set on the notification setting selection window, the coverage-zone mark is only turned on (step S309).

Furthermore, the CPU 6 checks the contents displayed/set on the display setting selection window in FIG. 7D (step S310), and a display operation is performed in accordance with the selected display setting.

If display setting "Off" is selected on the display setting selection window in FIG. 7D, no display operation is performed (step S311). If the user operates the switch circuit 3 to set "mode 1", a non-coverage-zone stay time is displayed on the LCD 8 (step S312). If the user sets "mode 2", a message and a non-coverage-zone stay time are displayed on the LCD 8 when the message is read out from the RAM 7 (step S313).

Note that the switch circuit 3 of the radio selective calling receiver of this embodiment has four switches (not shown) for a display operation. More specifically, the switch circuit 3 has a menu switch for displaying a menu window or a window immediately before the current window, a "↓" switch for selecting a lower item, a "↑" switch for selecting an upper item, and a tab switch for status confirmation. When these switches are operated, corresponding signals are sent to the decoder 4.

Figure 8:
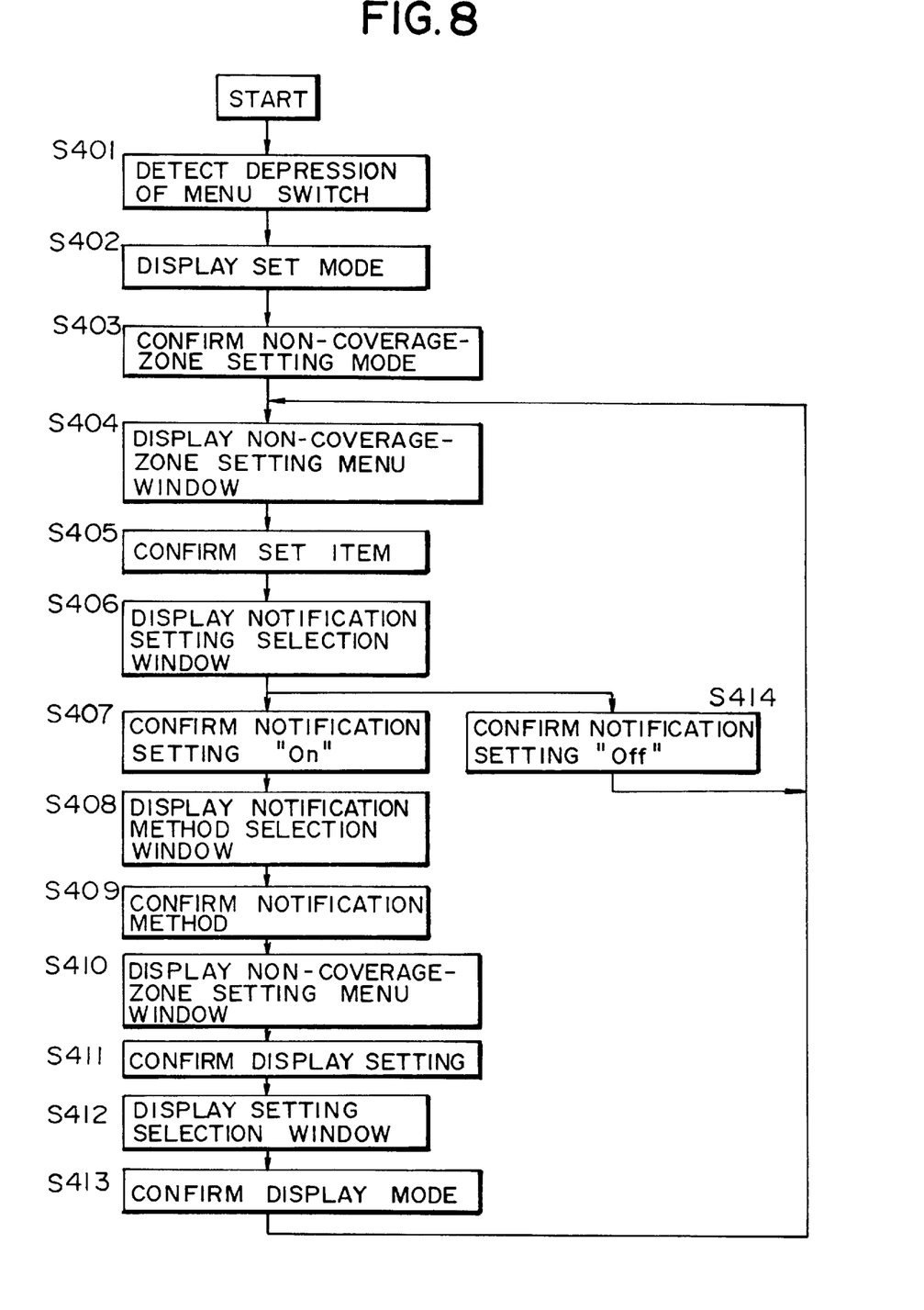
FIG. 8 is a flow chart showing procedures for notification setting and display setting in the embodiment in FIG. 2.

FIG. 8 is a flow chart showing procedures for notification setting and display setting in the radio selective calling receiver of this embodiment.

Notification setting and display setting operations in this embodiment will be described with reference to FIGS. 2, 7A to 7D, and 8.

When the decoder 4 detects depression of the menu switch for a setting mode (step S401), the corresponding information is transferred to the CPU 6 through the control bus CB, and the LCD driver 9 displays the setting mode on the LCD 8 (step S402).

The user depresses the "↓" or "↑" switch, and the decoder 4 detects a designation signal from the tab switch which is subsequently depressed to confirm the non-coverage-zone setting mode, thereby confirming the non-coverage-zone setting mode (step S403).

When the non-coverage-zone setting mode is set, the corresponding information is transferred to the CPU 6 through the control bus CB, and the CPU 6 instructs the LCD driver 9 to display a non-coverage-zone setting menu on the LCD 8.

More specifically, the CPU 6 starts the LCD driver 9 to display the non-coverage-zone setting menu window (FIG. 7A) on the LCD 8 (step S404).

The user sees this non-coverage-zone setting menu, and depresses the "↓" or "↑" switch to determine a setting item. The decoder 4 then detects a designation signal from the tab switch which is subsequently depressed to confirm the setting item, thus confirming the setting item (step S405).

If "1: notification setting" is selected and confirmed, the corresponding information is transferred to the CPU 6 through the control bus CB, and the notification setting selection window (FIG. 7B) is displayed on the LCD 8 through the LCD driver 9 (step S406).

The user sees this notification setting selection window and depresses the "↓" or "↑" switch to determine "On" or "Off". The decoder 4 then detects a designation signal from the tab switch which is subsequently depressed to confirm "On" or "Off", thus confirming the notification setting "On" or "Off".

If the notification setting "On" is confirmed (step S407), the corresponding information is transferred to the CPU 6 through the control bus CB, and the notification method selection window (FIG. 7C) is displayed on the LCD 8 through the LCD driver 9 (step S408).

The user depresses the "↓" or "↑" switch to determine the speaker/vibration motor mode on this notification method selection window, and the decoder 4 detects a designation signal from the tab switch which is subsequently depressed to confirm the notification method, thus confirming the notification method (SP (notification by means of the speaker)/VIB (notification by means of the vibration motor) (step S409).

When the notification method "SP/VIP" is confirmed, the corresponding information is transferred to the CPU 6 through the control bus CB, and the non-coverage-zone setting menu window (FIG. 7A) is displayed on the LCD 8 again through the LCD driver 9 (step S410).

If the notification setting "Off" is confirmed on the notification setting selection window (step S414), the display window of the LCD 8 returns to the non-coverage-zone setting menu window (FIG. 7A) (step S404).

The user sees this non-coverage-zone setting menu and depresses the "↓" or "↑" switch to determine a setting item. The decoder 4 detects a designation signal from the tab switch which is subsequently depressed to confirm the setting item, thus confirming the setting item.

If the user selects and confirms "2: display setting" (step S411), the corresponding information is transferred to the CPU 6 through the control bus CB, and the display setting selection window (FIG. 7D) is displayed on the LCD 8 through the LCD driver 9 (step S412).

The user sees this display setting selection window and depresses the "↓" or "↑" switch to determine a display mode. The decoder 4 then detects a designation signal from the tab switch which is subsequently depressed to confirm the display mode, thus confirming the display mode (step S413).

When the display mode "mode 1", "mode 2", and "Off" is confirmed, the corresponding information is transferred to the CPU 6 through the control bus CB, and the flow returns to step S404 to display the non-coverage-zone setting menu (FIG. 7A) on the LCD 8 through the LCD driver 9 (step S404).

Display modes in this embodiment will be described next with reference to FIGS. 9A and 9B.

Figure 9A:
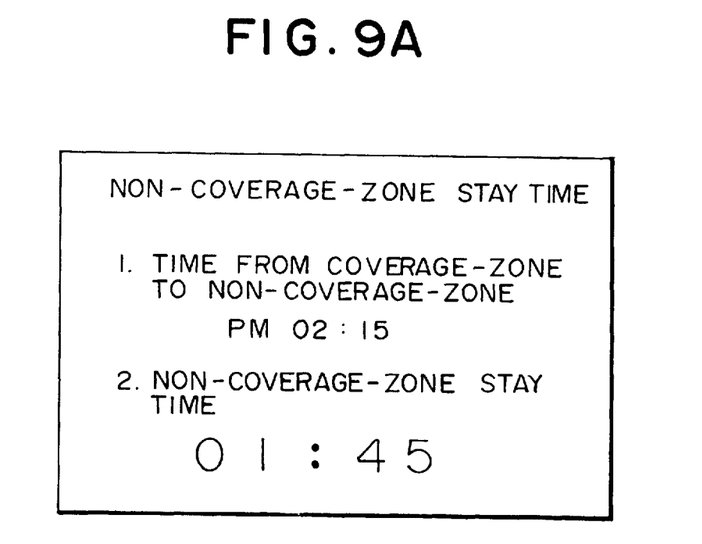
FIGS. 9A and 9B are views showing a non-coverage-zone stay time display mode (display mode 1) and a message display mode (display mode 2) selected in FIG. 7D.
Figure 9B:
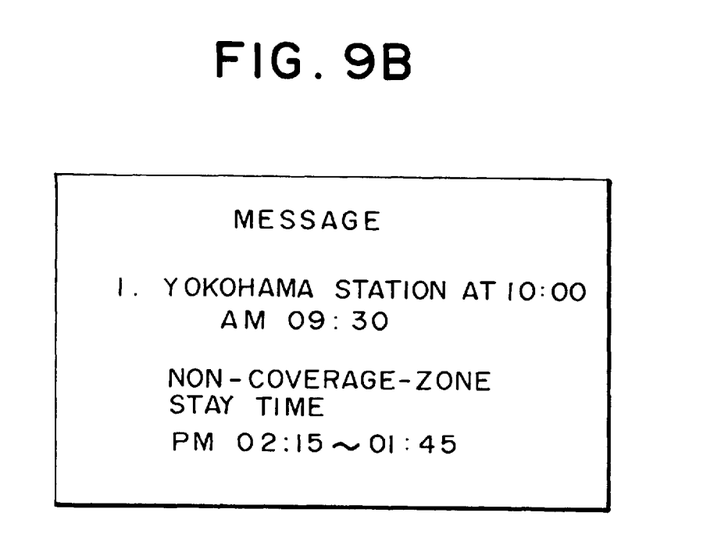

FIGS. 9A, 9B, and 7D show examples of the display modes displayed/set/selected. FIG. 9A shows a non-coverage-zone stay time (display mode 1). FIG. 9B shows a message (display mode 2).

In the display mode 1, when a switching operation is performed to confirm a non-coverage-zone stay time while the radio selective calling receiver is outside the coverage zone, or at the same time when notification is automatically performed upon moving the radio selective calling receiver into the coverage zone, only the non-coverage-zone stay time is displayed on the LCD 8. FIG. 9A shows that the radio selective calling receiver moved outside the coverage zone at 2:15 pm, and the non-coverage-zone stay time is one hour and 45 minutes.

In the display mode 2, when a switching operation is performed while the radio selective calling receiver is outside the coverage zone, or when a message is displayed on the LCD 8 at the same time when notification is automatically performed upon moving the radio selective calling receiver into the coverage zone, a non-coverage-zone stay time is displayed, together with the message. FIG. 9B shows that a message "Yokohama station at 10:00" was received at 9:30 am, and the non-coverage-zone stay time is one hour and 45 minutes from 2:15 pm.

Note that "Off" in FIG. 7D is the mode of displaying no non-coverage-zone stay time.

The menu switch is depressed to display the menu window or the window immediately before the current window. When the menu switch is depressed once, the decoder 4 detects this operation to perform control to return to the display window immediately before the current window. When the menu switch is not operated within a predetermined time period (e.g., 40 seconds), or the power switch (not shown) is turned off, the above read control/display control operation is terminated.

What is claimed is:

1. A radio selective calling receiver which determines that said radio selective calling receiver is within a coverage zone of a radio base station based on when synchronization is established with the radio base station by receipt of a frame synchronization signal from the radio base station, and which determines that said radio selective calling receiver is outside the coverage zone of the radio base station based on when no frame synchronization signal is received within a predetermined time period after a step-out state is set, the radio selective calling receiver comprising:

a timer which starts to count when the step-out state is set and which continues counting a time until a frame synchronization signal is received thereby producing a count value, and notification means for providing notification of the count value when the frame synchronization signal is received after the lapse of the predetermined time period set in said timer.

2. The receiver according to claim 1, further comprising:

display means for displaying the count value when the frame synchronization signal is received after the lapse of the predetermined time period set in said timer, and display operation selection means for allowing a user to select whether to perform a display operation and for allowing a user to select, if execution of a display operation has been selected, a method of display;

wherein said display means performs a display operation by a display method selected by the user.

3. The receiver according to claim 1, wherein said notification means comprises:

a plurality of notification devices including a speaker and a vibration motor, and notification operation selection means for allowing a user to select at least one of said notification devices for providing notification.

4. The receiver according to claim 1, further comprising:

a radio section for receiving and demodulating an individual call signal from the radio base station, an EEPROM in which a self-unique call signal and system information unique to the radio selective calling receiver are stored in advance, a decoder for decoding a signal demodulated by said radio section, comparing the decoded signal with the self-unique call signal stored in said EEPROM, and outputting received data when the decoded signal coincides with the self-unique call signal, a ROM in which a control program for controlling operation of the radio selective calling receiver is stored in advance, a CPU for executing the control program, a RAM for storing and outputting the received data under the control of said CPU, an LCD for displaying data supplied from said timer and from said RAM, and a switch circuit for outputting a designation signal for selecting a display method for the LCD, wherein said notification means includes a speaker and a vibration motor for, when reception is performed, notifying a user of corresponding information.

* * * * *

UNITED STATES PATENT AND TRADEMARK OFFICE
CERTIFICATE OF CORRECTION

PATENT NO. : 5,847,657
DATED : December 8, 1998
INVENTOR(S) : Kinya Tsuchiyama

It is certified that error appears in the above-identified patent and that said Letters Patent is hereby corrected as shown below:

Column 1, Line 55   delete "ratio" and insert --radio--

Column 8, Line 7   delete "motor)" and insert --motor))--

Column 8, Line 9   delete "VIP" and insert --VIB--

Signed and Sealed this

Eighteenth Day of May, 1999

Attest:

Q. TODD DICKINSON

Attesting Officer

Acting Commissioner of Patents and Trademarks